April 1, 1958 J. M. KORMENDY 2,828,600
BALE TRAILER
Filed Dec. 20, 1956 4 Sheets-Sheet 1

INVENTOR.
JOSEPH M. KORMENDY,
BY
McMorrow, Berman & Davidson
ATTORNEYS.

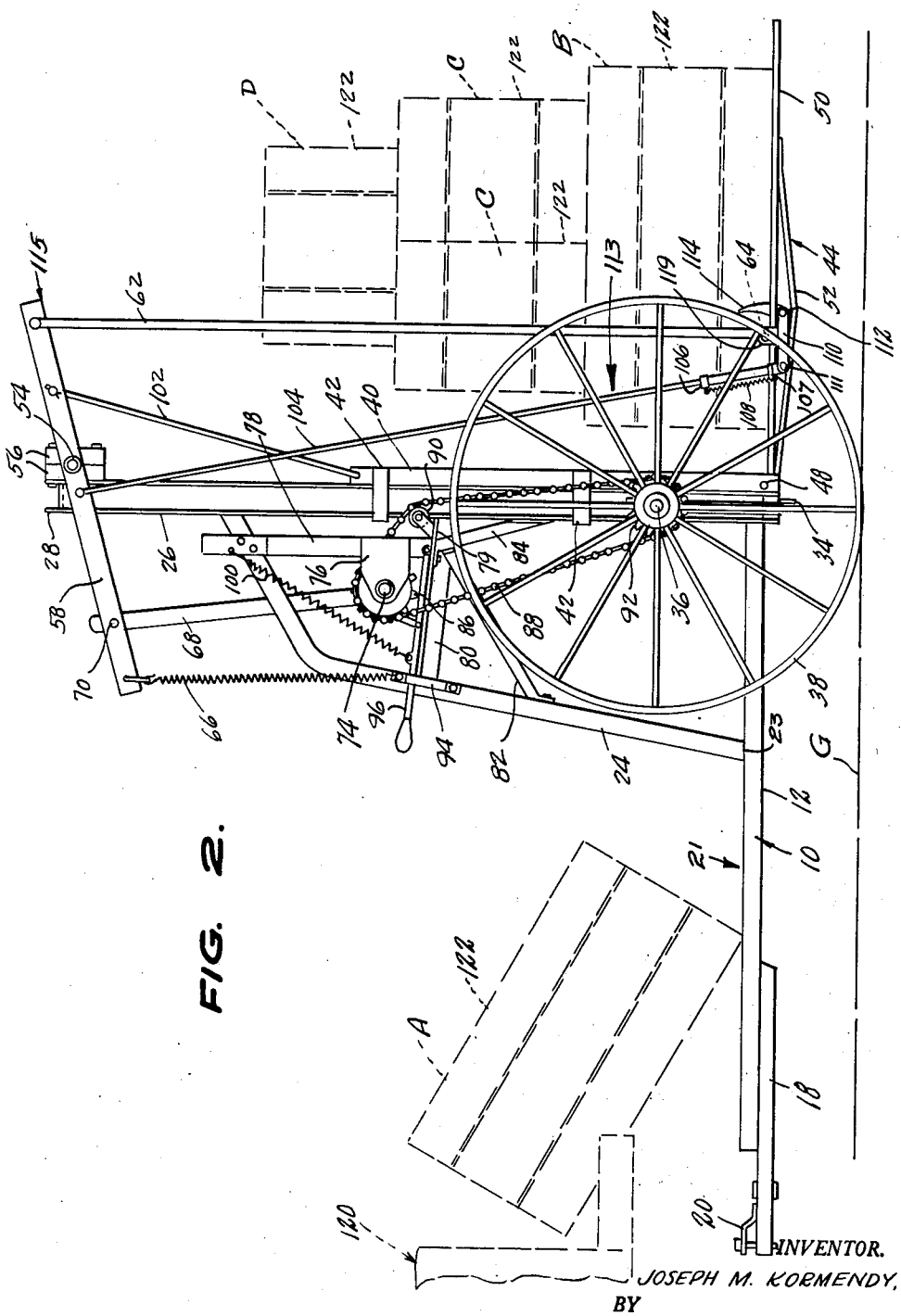

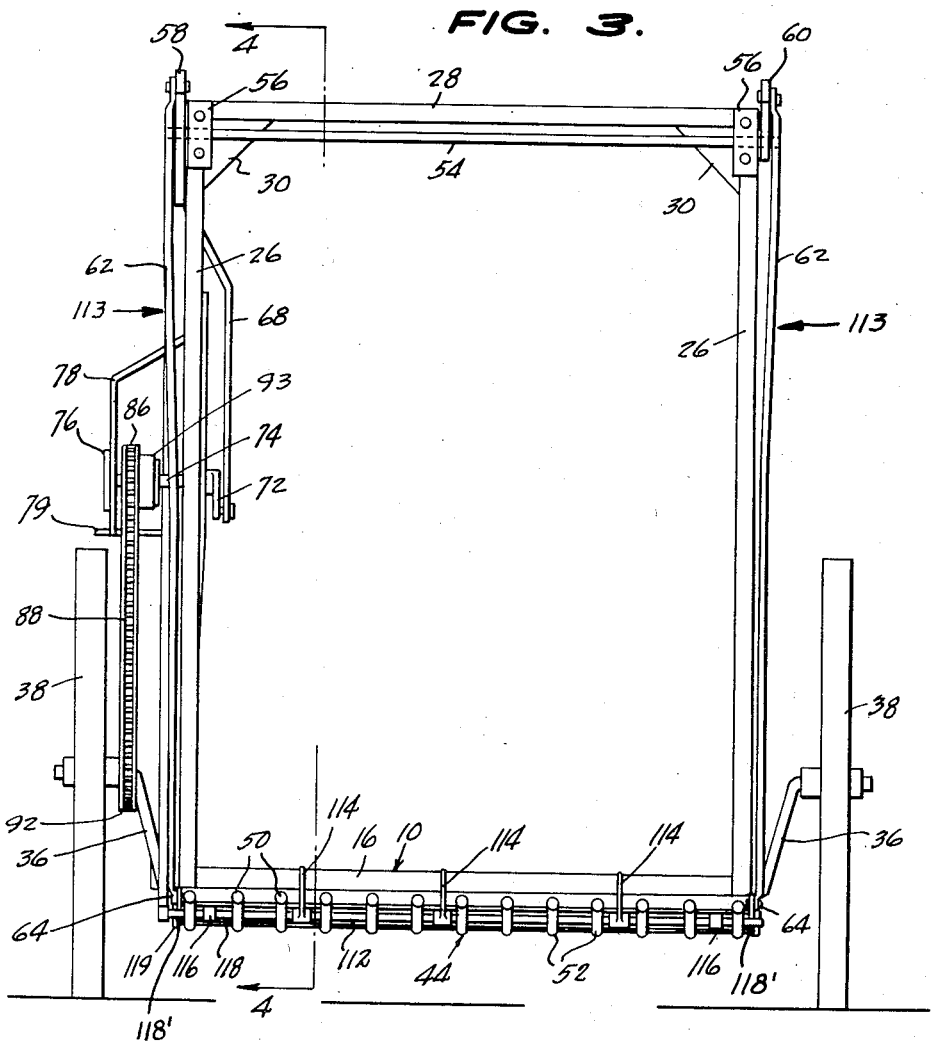

April 1, 1958   J. M. KORMENDY   2,828,600
BALE TRAILER
Filed Dec. 20, 1956   4 Sheets-Sheet 4
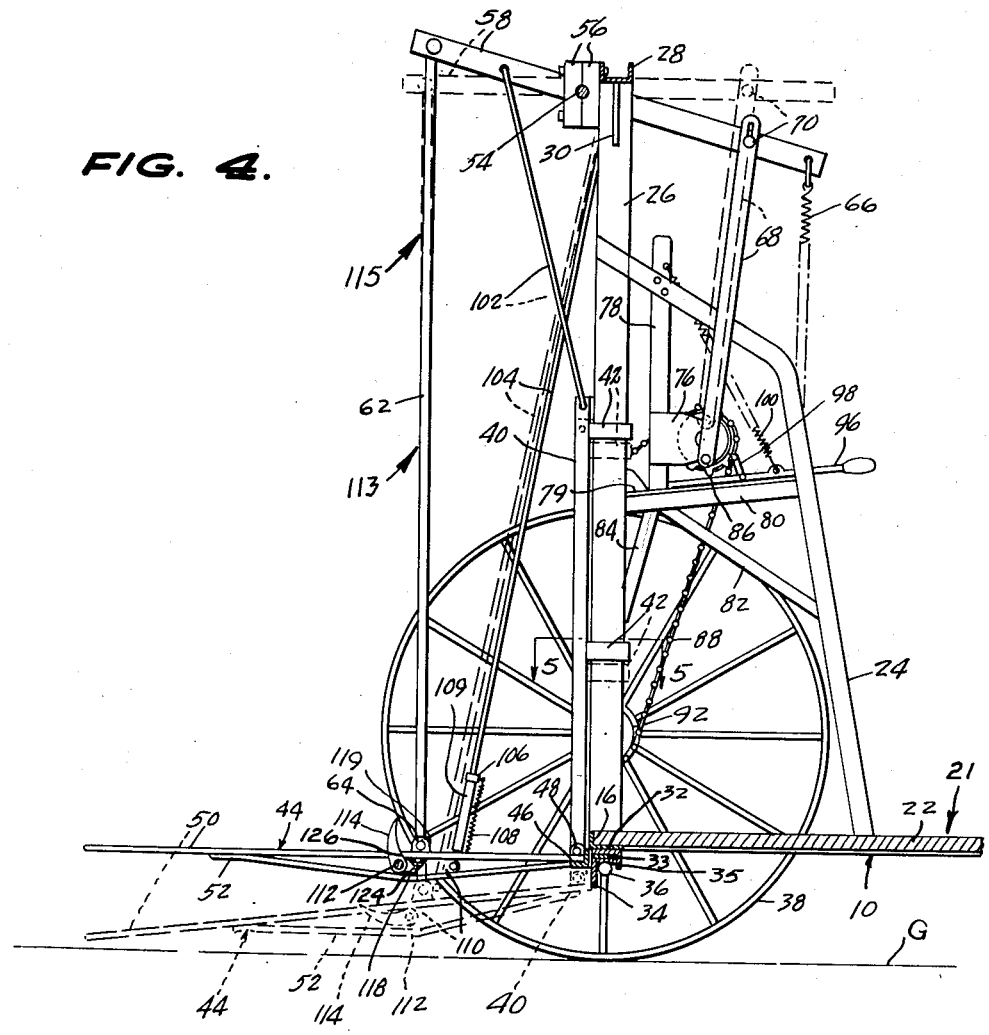
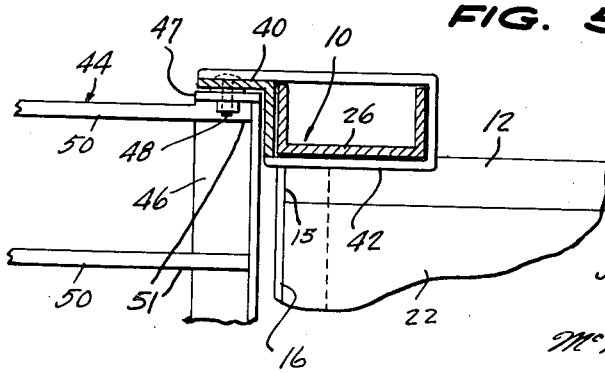
INVENTOR.
JOSEPH M. KORMENDY,
BY
McMorrow, Berman & Davidson
ATTORNEYS.

United States Patent Office 2,828,600
Patented Apr. 1, 1958

2,828,600
BALE TRAILER
Joseph M. Kormendy, Selby, S. Dak.
Application December 20, 1956, Serial No. 629,698
4 Claims. (Cl. 56—473.5)

This invention relates to devices for unloading and stacking baled hay or the like. More particularly, the invention has reference to a trailer adapted to be drawn by a hay baler, so as to receive bales as they drop from the chute of the baler, facilitate stacking of the bales in a selected number and arrangement, and effect the discharge of the stacks at selected locations on a field.

A hay baler, as it travels along a field, discharges bales at periodic intervals, with the bales being discharged singly and dropping to the surface.

This arrangement is undesirable, since it results in the bales being scattered individually over the entire area of the field. Accordingly, it is a common practice to require one or more workers, who must stack the bales in groups of a selected number, as for example six bales. The stacking operation is separate and distinct from the baling of the hay, and is itself a time-consuming, laborious operation, occupying a relatively large number of workers over an excessive period of time.

The main object of the present invention is to provide a bale trailer, drawn by the baler, with the trailer being designed to allow one-man operation in such a way that the single worker, riding upon the trailer, can conveniently stack the bales upon the trailer as they are received from the baler chute, after which a throw of a trip handle effects the automatic discharge of the stacked bales, with the stack gently sliding from the trailer.

Another object is to provide a device of the character stated that will be efficient in operation, and will require a minimum amount of effort on the part of the single worker occupied with the duty of stacking and unloading the bales.

A further object is to provide a novel mechanism for unloading the stacked bales, which mechanism will include a plurality of cooperating linkages relatively arranged in such a manner that simultaneously with movement of the bales off a supporting platform, a plurality of fingers that normally hold the bales in place will be retracted in a manner to permit gravitation of the bales off the platform, and, in fact, impart a rearward pressure against the stack of bales tending to aid in the gravitational movement thereof from said platform.

Another object is to so design the cooperating linkages mentioned above that all components will be automatically returned to place following discharge of the bales, by reason of a driving connection with the ground wheels of the trailer, which driving connection serves both to operate the linkages for discharging the stacked bales, and for operating the linkages to return the same to their normal position for stacking of a new quantity of bales and subsequent unloading thereof.

Other objects will appear from the following description, the claims appended thereto, and from the annexed drawing, in which like reference characters designate like parts throughout the several views, and wherein:

Fig. 2 is a side elevational view thereof;

Figure 3 is a rear elevational view;

Figure 4 is a longitudinal sectional view on line 4—4 of Figure 3; and

Figure 5 is an enlarged, detail sectional view on line 5—5 of Figure 4.

Figure 1:
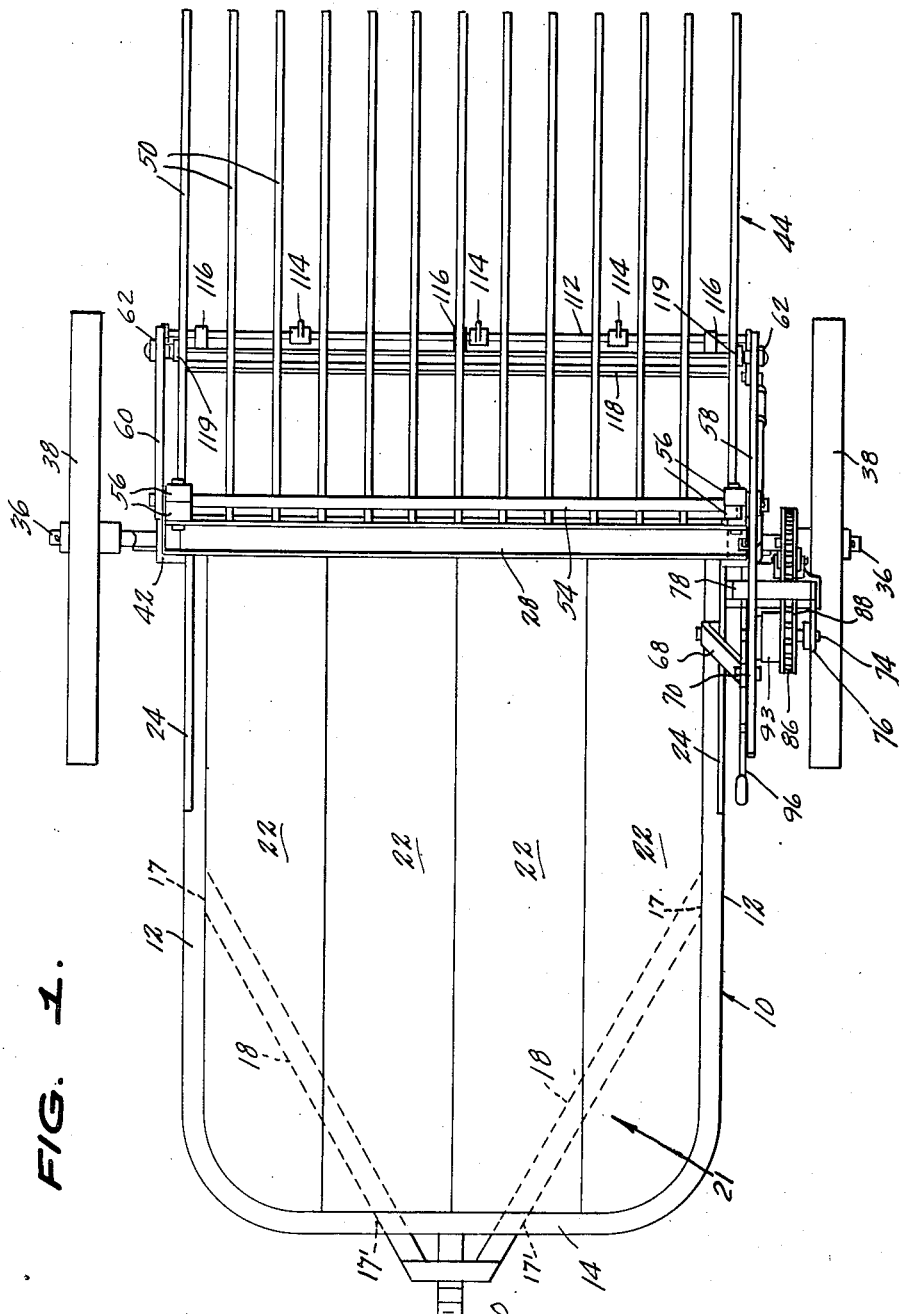
Figure 1 is a top plan view of a bale stacking and unloading device according to the present invention.

Referring to the drawings in detail, designated generally by the reference numeral 10 is a rollable support structure, including a substantially horizontally disposed, U-shaped platform frame (Figure 1). The platform frame includes elongated, straight side rails 12 integral at their forward ends with a front cross member 14. Connected between the rear ends of the side rails, and secured fixedly to the side rails by welding or by equivalent means, at locations designated at 15, is a rear cross member 16 of angle iron material (Figure 4).

Welded at 17, 17' (Figure 1) to the respective side rails and to the cross members 14 are forwardly converging tongue members 18, fixedly connected at their convergent ends by a short cross piece to which is secured a clevis 20, whereby the trailer can be attached to and drawn behind a conventional hay baler.

As will be seen, this defines a generally rectangular, open, platform frame, and closing the open center of the frame are boards 22 extending in a fore-and-aft direction and supported upon the frame, thus to provide a receiving platform generally designated 21 on the forward end portion of the trailer located a relatively short distance above the ground G, so as to receive bales passing out of the discharge chute of the hay baler behind which the trailer is drawn.

Welded at 23 or otherwise fixedly secured to intermediate portions of the side rails 12 are elongated, upwardly projecting, obtusely angular side braces 24 of an overhead, operating linkage support frame of inverted U-shape disposed in a vertical plane lying transversely of the trailer at the rear end of the receiving platform. Said frame includes outwardly facing channels 26 providing standards, and connected fixedly between the upper ends of the standards 26 is a horizontal, upwardly facing channel member 28 forming a cross member on the linkage support frame. Gussets 30 (Figure 3) reinforce the joints between the cross member 28 and the respective standards 26.

Fixedly connected between the lower ends of the standards 26, in longitudinally contacting relation to the rear cross member 16 of the platform frame, is an axle frame including an angle iron member 32 (Figure 4) and welded at 33 to the underside of the angle iron member 32 at opposite ends thereof are depending angle iron members 34, to the underside of which are welded, at 35, identically but oppositely formed drop axles 36, the outer ends of which (Figure 3) are offset upwardly from the plane of the receiving platform, and provide shafts on which rotate ground wheels 38. These are preferably rubber tired.

From the description so far provided, it will be seen that the invention includes a rollable structure, having a forwardly projecting receiving platform, and having ground wheels at the rear end of the platform, said structure further including a vertically disposed, transversely arranged, arch-like support frame for the operating linkages of the trailer, with said vertical support frame being open to permit the free passage of the bales therethrough.

Rearwardly of the receiving platform, there is provided a normally horizontally disposed bale basket or discharge platform. This is located in a horizontal plane offset slightly downwardly from the plane of the receiving platform, while the bales are being stacked. However, the discharge platform can be lowered bodily so as to be disposed closer to the ground, and at the same time tilted slightly out of the horizontal to locate the rear end of the platform substantially in contact with the ground, thereby producing an inclined slideway off which the stack of bales will move onto the ground.

To accomplish the bodily downward movement of the discharge platform, there are provided vertically disposed discharge platform support bars 40 of angle iron material (see Figures 4 and 5). These are in longitudinally contacting relation to the respective standards 26, and slide upwardly and downwardly on the standards between the full and dotted line positions shown in Figure 4, through the provision of guides 42. Guides 42 are formed of strap iron material, with each guide being fixedly connected at its opposite ends to the associated bar 40 and extending, intermediate its ends, about the associated standard 26.

The discharge platform has been generally designated at 44, and is shown in its normal full line and its load-discharging, dotted line positions in Figure 4 of the drawing. The discharge platform or bale basket is of the type including a plurality of rearwardly extending fork arms (see Figure 1), and at the rear end of the receiving platform, the discharge platform includes a cross member 46 of angle iron material, having end walls 47 receiving pivot bolts 48 whereby the platform 44 is hingedly connected to the lower ends of the support bars. The end walls 47 are formed by bending the ends of the angle iron upwardly and welding them to the main portions of the angle irons to reinforce the same and hold the bale basket or discharge platform against lateral deviation.

The hinge bolts 48 connect the platform 44 to the bars 40 for swinging movement about a horizontal axis extending transversely of the trailer adjacent the rear end of the receiving platform, with the swinging movement occurring substantially simultaneously with movement of the bars 40 downwardly from their normal, full line positions of Figure 4. Thus, the discharge platform is bodily lowered so as to be disposed close to the ground, and at the same time declines in a direction rearwardly from the receiving platform, so that the stacked bales will gravitate from the discharge platform onto the ground G.

The fork arms have been designated at 50, and are welded at 51 or otherwise fixedly secured at their inner ends to the cross member 46, at locations uniformly spaced transversely of the trailer. Fork arms 50 are straight from end to end, and are rigidified through the provision of truss-like brace bars 52 fixedly connected between member 46 and the rear or free end portions of the fork arms. The brace bars 52 are shallowly obtusely angular in shape, so as to locate the intermediate portions of the brace bars downwardly from the fork arms 50.

There will now be described the means whereby the discharge platform is bodily lowered with the bars 40, and swung about the axis of its connections to said bars. Referring to Figures 3 and 4, a rock shaft 54 extends horizontally, transversely of the trailer adjacent the upper end of the vertically disposed linkage support frame, the ends of shaft 54 being journalled in wood block bearings 56 secured to the opposite sides of the vertical frame. Fixedly connected to one end of shaft 54, to rock therewith, is a main rock arm 58, this being connected to shaft 54 intermediate the ends of the arm as shown in Figure 4. Similarly connected to the other end of the shaft 54 is an auxiliary rocking arm 60, this being connected to shaft 54 at its forward end, as will be noted from Figure 1.

To the rear ends of arms 58, 60 there are pivotally connected the upper ends of elongated support links 62 of discharge platform 44, the lower ends of said links being pivotally connected at 64 to ears 119 rigid with and projecting upwardly from an elongated cross bar 118 disposed in the space between the fork arms 50 and their associated brace bars 52.

Thus, when arms 58, 60 are in one position, said position for the arm 58 being shown in full lines in Figure 4, the platform 44 will be substantially horizontally disposed. When, however, the arm 58 rocks counterclockwise in Figure 4 from said full line position thereof, the links 62 will be lowered, so that the platform 44 will in turn be swung downwardly to its unloading, inclined position.

Normally holding the arm 58, and hence the arm 60 in a position to support platform 44 horizontally is a contractile spring 66 connected between the forward end of arm 58 and the adjacent side brace 24 of the supporting structure. However, to swing the arm 58 and arm 60 to the dotted line position, there is utilized a pusher link 68 (Figure 4) having a lost motion, pivotal connection 70 at its upper end to the forward portion of arm 58 such that on upward movement of link 68, the arm 58 will be swung counterclockwise in Figure 4.

Referring now to Figure 3, the pusher link or pitman 68 is pivotally connected at its lower end to a crank arm 72 rotating with stub shaft 74 journalled in bearing plates 76, only one of which is shown. One of the bearing plates 76 is fixedly secured to and projects forwardly from a bearing plate support arm 78 the upper end of which is riveted or otherwise fixedly connected to the upper end portion of the adjacent side brace 24. Arm 78 is offset laterally outwardly of the supporting structure at its lower end, as shown in Figure 3, and is connected at said lower end thereof to a correspondingly laterally, outwardly projecting ledge 79. The other bearing plate is carried by the ledge, to support the stub shaft 74 for rotation in a horizontal position extending transversely of the structure at one side thereof.

Rotatable on the shaft or axle 74 is a sprocket driven from the ground wheels of the device. Said sprocket is at times held against rotation and at other times is permitted to rotate to operate the linkage used for dropping and inclining platform 44.

To support the components used in association with the sprocket, there are provided, in addition to the brace bar 80, braces 82, 84 (see Figure 4) fixedly connected between brace bar 80 and the brace 24 and standard 26 respectively. Ledge 79 is supported upon and is fixedly secured to the supporting brace 80, which brace 80 is fixedly connected directly between the brace 24 and standard 26.

The mentioned sprocket has been designated at 86, and it will be seen that on rotation thereof, crank 72 is correspondingly rotated, causing up and down reciprocating movement of pitman or pusher link 68, which in turn is translated into oscillating movement of the arm 58.

A chain 88 is trained about sprocket 86, and is maintained under tension by an adjustable idler 90 (Figure 2). Chain 88 is also trained about a sprocket 92 secured to the hub of the adjacent wheel and turning with the wheel.

The sprocket 86, it should be noted, has driving engagement with the crank arm 72, through the medium of a clutch 93. In other words, the sprocket freely rotates on the stub shaft, and is continuously rotating as long as the trailer is moving forwardly over the ground. The sprocket is connected to one face of the clutch, and the other clutch face is connected to the shaft 74, which rotates in its bearings 76 whenever the clutch is engaged, to correspondingly rotate the arm 72.

Secured to the adjacent brace 24 is a guide 94 (Figure 2), limiting up and down swinging movement of a clutch-operating arm 96, that is pivotally mounted upon the ledge 79. The clutch-operating arm 96, when in its normal upward position shown in Figure 2, disengages the clutch so that crank arm 72 does not turn. When, however, the arm 96 is thrown downwardly, the clutch is thereby engaged to cause conjoint rotation of crank arm 72 and sprocket 86. The operating finger of the clutch-engaging arm 96 has been shown at 98 and may be formed in any suitable manner, as for example, it may enter as a wedge between the opposite clutch faces when the arm 96 is in its upper position. Arm 96 is normally maintained in its upper position by a contractile spring 100 connected between the arm and the upper end of the member 78 (see Figure 2).

Referring now to the means whereby the bars 40 are lowered to bodily lower the discharge platform, connecting links or rods 102 are pivotally connected between the upper ends of the respective bars 40 and the rear end portions of the arms 58, 60 respectively. As a result, whenever arm 58 is swung clockwise about its pivot axis 54 in Figure 2, the links or rods 102 are moved downwardly, to correspondingly shift in a downward direction the support bars 40 of the discharge platform.

Means is associated with the discharge platform that normally provides bale-engaging fingers that project upwardly above the plane of the discharge platform 44, to engage in the lowermost of a plurality of stacked bales whenever the discharge platform is in its raised position. Said means is adapted, further, to be automatically retracted responsive to movement of the discharge platform to its dotted line position of Figure 4, with the retraction not only serving to free the stacked bales for discharge, but also serving to give the stack of bales a rearward impetus tending to initiate the gravitational movement thereof from the discharge platform.

This means includes elongated operating rods 104 pivotally connected to the arms 58, 60 slightly in advance of the pivot axis 54 of these arms. In other words, each time links 62, 102 are lowered by clockwise rotation of arm 58 in Figure 2, the links or rods 104 are raised at the same time.

Secured to the lower end portion of each rod 104 is a set collar 106, to which is connected a contractile spring 108 the other end of which is connected at 111 to a pin sliding in a sleeve 109 secured to and extending axially of and beyond rod 104.

The pin is connected to the rear ends of arms 110 disposed at opposite sides of the discharge platform 44 and extending radially from and fixedly connected at their forward ends to a rock shaft 112. Rock shaft 112 extends transversely of platform 44 immediately below the fork arms 50, in the space between the arms 50 and braces 52. At selected locations along the lengths of shaft 112 there are fixedly secured thereto upwardly and rearwardly curving, pointed stop fingers 114. These normally extend upwardly above the plane of the platform 44 to engage in the lowermost bales of the stack supported upon the platform. The arms 110 swing between the full and dotted line positions of Figure 4, and links 62 may be provided on their lower ends with clamp-like means to keep the arms 110 from going over center when bales are discharged.

The arrangement is one such that when the platform 44 is in its upper position, the arms 110 will be disposed in substantial parallelism with the plane of the discharge platform. However, when arm 58 is rocked clockwise in Figure 2, causing the platform 44 to be bodily lowered and swung to an inclined position shown in dotted lines in Figure 4, initially the arms 110 will not swing out of their normal positions, due to engagement of fingers 114 in the lowermost bales of the stack and due, further, to the fact that even though the pin slides in sleeve 106 downwardly to place the spring 108 under increased tension, the tension of the spring will not be so great as to overcome the resistance imposed by engagement of the stop fingers in the bales.

However, continued downward movement of the platform 44, accompanied by the mentioned tilting of the platform, will eventually build up the value of the pull of the springs 108 to a point such that the arms 110 will be swung upwardly to their dotted line positions of Figure 4. This retracts the fingers 114 so that they no longer project above the plane of the platform 44, thus disengaging the fingers from the bales to permit the bales to slide off the platform. The parts 104–112 inclusive constitute a rod assembly generally designated 113. The rod assembly 113, the rods 102, arms 58, and links 62 constitute a means 115 for vertically shifting the bars 40, swinging platform 44, and pivoting fingers 114.

To support the rock shaft 112 for rotatable movement, there is provided a cross member or cross bar 118 of T-shaped cross section to the ends of which are welded, at 118′, the ears 119 carrying the pivotal connections 64. The ears 119 are formed as reinforcing plates of rectangular configuration, which plates also serve in cooperation with plates or walls 47, in holding the bale basket against lateral movement. Projecting rearwardly from the member 118 are bearings 116 for the shaft 112, with the member 118 being welded at 124, 126 to the brace bars 52 and the fork arms 50, respectively.

Considering now the operation of the device, and referring to Figure 2, designated generally at 120 is a traction vehicle, which in the present instance is a hay baler, only the rear end thereof being shown. At periodic intervals, bales 122 are discharged from the baler chute, and initially are in the positions A. Bales 122 are thus singly dropped to the receiving platform of the trailer, on which platform a single worker would stand.

The worker receives the bales, and deposits the same upon the discharge platform 44. In a preferred stacking arrangement, three bales 122 are extended in a fore-and-aft direction, in side by side relation on the platform 44, as shown at B in Figure 2. Then, two bales are disposed in the positions C, extending transversely of the trailer and supported upon the three bales previously referred to. Finally, a single bale 122 is laid on its side, upon the two middle bales, in the position D of Figure 2.

When six bales have been stacked in this manner, the worker throws the clutch-operating arm 96 downwardly against the restraint of spring 100. As a result, the crank arm 72 of Figure 3 is drivingly engaged, and rotates slowly, it being understood that the crank arm would make a single rotation for each rotation of the large ground wheels 38.

Rotation of the crank arm from its normal position shown in Figure 3 will cause the pitman 68 to be shifted upwardly to its dotted line position of Figure 4, after rotation of the crank arm through 180 degrees. This rocks arm 58 and arm 60 counterclockwise in Figure 4 to the dotted line position shown in this figure, against the restraint of spring 66.

In turn, this shifts downwardly rods or links 62, 102. The links 102 move downwardly a shorter distance than the links 62, because they are closer to the pivot axis 54 of the arm 58.

The downward movement of the links 102 will cause the inner end of the discharge platform to be shifted bodily toward the ground, that is, the axis on which the platform is hinged is moved downwardly, and at the same time, the platform 44 is swung downwardly upon said axis to an inclined position in which the free end of the platform is disposed in closely spaced relation to the ground surface.

As the bales are being loaded, the fingers 114 will be in upwardly projecting positions shown in full lines in Figure 4 so as to be embedded in the lowermost bales, that is, the bales in the position B of Figure 2. This holds the bales against accidental movement of the platform 44 during stacking, which is particularly desirable in view of the fact that the terrain may be somewhat rough.

However, when platform 44 is shifted downwardly and tilted, the fingers 114 will, as the platform 44 approaches its final dotted line position in Figure 4, be swung counterclockwise in Figure 4 to be fully retracted. This disengages the fingers from the bales, and not only frees the bales for gravitation off the now inclined platform 44, but in addition gives the stack a rearward impetus as previously mentioned, due to the fact that the fingers 114 swing toward the rear or discharge end of the platform 44.

The stack will now slide gently off the platform 44, and during the continued forward movement of the trailer will remain on the ground, in the stacked arrangement shown in dotted lines in Figure 2.

The operation is so timed that when the bales slide off the platform 44, the pitman 68 begins to move downwardly once again as the crank arm 72 begins to travel through the second 180 degrees of its single cycle of rotation. There is a lost motion connection at 70 between the link 68 and arm 58, as previously mentioned, so that initially, if the bales have not fully moved off the platform 44, there will be no tendency of the arm 58 to return from its dotted to its full line position of Figure 4, since the weight of the bales, if still imposed on the platform 44, can counteract the pull of the spring 66.

However, as soon as the bales have moved fully off the platform, spring 66 is completely free to contract, and as link 68 moves downwardly, it causes the rear end of arm 58 to travel upwardly, raising the rods 62, 102, 104 and hence returning the discharge platform and the associated stop fingers to normal position, awaiting stacking of the next quantity of bales.

The operation is continued, and is so timed that the stacking of the bales on the trailer may proceed in an orderly manner, in properly timed relationship to the discharge of the bales from the hay baler 120. A single worker, thus, with minimum effort, is enabled to operate the entire device, stacking the bales neatly and effecting their discharge whenever desired by throwing the arm 96 downwardly and holding the same in a downward position until the operation is completed. It may be noted that if the discharge of the bales from platform 44 proceeds too slowly in a particular instance, the worker can temporaily throw the arm 96 upwardly to disengage, for a few moments, the driving connection to the pitman 68 until the bales have fully cleared the platform 44, after which the operating arm 96 is again shifted downwardly to effect the return of the parts to their normal position. Arm 96 is released as soon as link 68 has reached the lowermost point of its travel.

The device can be used to advantage, of course, with round as well as rectangular bales.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A stacking and unloading bale trailer comprising a tractable support structure including a bale-receiving platform; support bars vertically slidable on said structure between upper and lower positions; a discharge platform hinged on the bars to shift in a vertical direction therewith and be swingable thereon, the discharge platform being horizontally positioned in the upper position of the bars for stacking of the bales and being inclined in the lower position of the bars for sliding of the stacked bales off the discharge platform; stop fingers pivoted on the discharge platform for movement between extended positions projecting upwardly from the discharge platform to engage the stacked bales, and retracted positions freeing the bales for sliding movement off the platform; and means on said structure controllable by a user and operatively connected to the bars, discharge platform, and stop fingers, for substantially simultaneously shifting the bars between their upper and lower positions, swinging the discharge platform between its horizontal and inclined positions, and pivoting the stop fingers between their extended and retracted positions.

2. A stacking and unloading bale trailer comprising a tractable support structure including a bale-receiving platform; support bars vertically slidable on said stucture between upper and lower positions; a discharge platform hinged on the bars to shift in a vertical direction therewith and be swingable thereon, the discharge platform being horizontally positioned in the upper position of the bars for stacking of the bales and being inclined in the lower position of the bars for sliding of the stacked bales off the discharge platform; stop fingers pivoted on the discharge platform for movement between extended positions projecting upwardly from the discharge platform to engage the stacked bales, and retracted positions freeing the bales for sliding movement off the platform; and means on said structure controllable by a user and operatively connected to the bars, discharge platform, and stop fingers, for substantially simultaneously shifting the bars between their upper and lower positions, swinging the discharge platform between its horizontal and inclined positions, and pivoting the stop fingers between their extended and retracted positions, comprising an arm rockably mounted on said structure, a link connected between the arm and discharge platform for swinging the discharge platform on the bars responsive to rocking of the arm, a rod connected between the bars and arm for shifting the bars on rocking of the arm, and a rod assembly connected between the arm and stop fingers for pivoting the fingers when the arm is rocked.

3. A stacking and unloading bale trailer comprising a tractable support structure including a bale-receiving platform; support bars vertically slidable on said structure between upper and lower postions; a discharge platform hinged on the bars to shift in a vertical direction therewith and be swingable thereon, the discharge platform being horizontally positioned in the upper position of the bars for stacking of the bales and being inclined in the lower position of the bars for sliding of the stacked bales off the discharge platform; stop fingers pivoted on the discharge platform for movement between extended positions projecting upwardly from the discharge platform to engage the stacked bales, and retracted positions freeing the bales for sliding movement off the platform; and means on said structure controllable by a user and operatively connected to the bars, discharge platform, and stop fingers, for substantially simultaneously shifting the bars between their upper and lower positions, swinging the discharge platform between its horizontal and inclined positions, and pivoting the stop fingers between their extended and retracted positions, comprising an arm rockably mounted on said structure, a link connected between the arm and discharge platform and swinging the discharge platform on the bars to its inclined position responsive to rocking of the arm in one direction, a rod connected between the bars and arm for shifting the bars to their lower positions on rocking of the arm in said direction, and a rod assembly connected between the arm and stop fingers and pivoting the fingers to their retracted positions when the arm is rocked in said direction.

4. A stacking and unloading bale trailer comprising a tractable support structure including a bale-receiving platform; support bars vertically slidable on said structure between upper and lower positions; a discharge platform hinged on the bars to shift in a vertical direction therewith and be swingable thereon, the discharge platform being horizontally positioned in the upper position of the bars for stacking of the bales and being inclined in the lower position of the bars for sliding of the stacked bales off the discharge platform; stop fingers pivoted on the discharge platform for movement between extended positions projecting upwardly from the discharge platform to engage the stacked bales, and retracted positions freeing the bales for sliding movement off the platform; and means on said structure controllable by a user and operatively connected to the bars, discharge platform, and stop fingers, for substantially simultaneously shifting the bars between their upper and lower positions, swinging the discharge platform between its horizontal and inclined positions, and pivoting the stop fingers between their extended and retracted positions, comprising a pair of arms conjointly rocking on said structure, links connected between the arms and the discharge platform and swinging the discharge platform on said bars to its inclined positions responsive to rocking of the arms in one direction, rods connected between the respective bars and arm for shifting the bars to their lower positions on rocking of the arms in said direction, and rod assemblies connected between the arms and stop fingers and pivoting the fingers to their retracted positions when the arms are rocked in said direction, said means further including a driving connection on the trailer operative to rock the arms responsive to forward movement of the trailer.

References Cited in the file of this patent

UNITED STATES PATENTS

| | | |
|---|---|---|
| 1,349,435 | Raney | Aug. 10, 1920 |
| 1,910,398 | Ludington | May 23, 1933 |
| 2,552,713 | Flower | May 15, 1951 |
| 2,702,131 | Leupke | Feb. 15, 1955 |
| 2,728,601 | Quigley | Dec. 27, 1955 |